(12) United States Patent
Pedersen et al.

(10) Patent No.: US 9,103,660 B2
(45) Date of Patent: Aug. 11, 2015

(54) DEVICE AND METHOD FOR DETECTING PRESENCE OF AN OBJECT

(75) Inventors: Henrik Chresten Pedersen, Jyllinge (DK); Michael Linde Jakobsen, Roskilde (DK); Vagn Steen Gruner Hanson, Fakse (DK)

(73) Assignee: O-Net Wavetouch Limited, Hong Kong (CN)

( * ) Notice: Subject to any disclaimer, the term of this patent is extended or adjusted under 35 U.S.C. 154(b) by 406 days.

(21) Appl. No.: 13/520,508

(22) PCT Filed: Jan. 4, 2011

(86) PCT No.: PCT/EP2011/050062
§ 371 (c)(1),
(2), (4) Date: Nov. 29, 2012

(87) PCT Pub. No.: WO2011/080348
PCT Pub. Date: Jul. 7, 2011

(65) Prior Publication Data
US 2013/0087695 A1    Apr. 11, 2013

(30) Foreign Application Priority Data
Jan. 4, 2010    (EP) .................................... 10150036

(51) Int. Cl.
*G06M 7/00*    (2006.01)
*G06F 3/042*    (2006.01)
*G01B 11/14*    (2006.01)
*G01V 8/14*    (2006.01)

(52) U.S. Cl.
CPC    *G01B 11/14* (2013.01); *G01V 8/14* (2013.01); *G06F 3/0428* (2013.01); *G06F 2203/04109* (2013.01)

(58) Field of Classification Search
CPC ................................ G01V 8/14; G06F 3/0428
USPC .......................................... 250/221; 345/175
See application file for complete search history.

(56) References Cited

U.S. PATENT DOCUMENTS 4,107,522 A * 8/1978 Walter .......................... 250/221
4,980,547 A * 12/1990 Griffin .......................... 250/221

(Continued)

FOREIGN PATENT DOCUMENTS

EP    1780559 A1    5/2007
WO    2009086836 A1    7/2009

*Primary Examiner* — Thanh Luu
(74) *Attorney, Agent, or Firm* — Hamilton, Brook, Smith & Reynolds, P.C.

(57) ABSTRACT

The present invention relates to a method (60) and device (2, 40, 50) for detecting presence of an object (52) by means of influencing propagation of light (16) arriving to a detector (14). The device (2, 40, 50) for detecting presence of the object (52) at the device (2, 40, 50) comprises a light source (4), a first redirecting structure (6), a second redirecting structure (10), and a light detector device (14). The light source (4) is adapted to emit light (16) towards the first redirecting structure (6), which is adapted to redirect light (16) from the light source (4) towards the second redirecting structure (10), which is adapted to return light (16) from the first redirecting structure (6) back towards the first redirecting structure (6), which is adapted to redirect light (16) from the second redirecting structure (10) towards the light detector device (14). The device (2, 40, 50) has a sensing zone (18) formed by light (16) propagating between the first redirecting structure (6) and the second redirecting structure (10).

18 Claims, 19 Drawing Sheets

(56) References Cited

U.S. PATENT DOCUMENTS

2005/0248540 A1* 11/2005 Newton ........................ 345/173
2007/0052684 A1 3/2007 Gruhlke
2007/0152985 A1 7/2007 Ostergaard et al.
2010/0277436 A1* 11/2010 Feng et al. .................... 345/175

* cited by examiner

DEVICE AND METHOD FOR DETECTING PRESENCE OF AN OBJECT

CROSS-REFERENCE TO RELATED APPLICATIONS

This is the national stage of International Application No. PCT/EP2011/050062, filed on Jan. 4, 2011, which claims the benefit of European Patent Application No. 10150036.1, filed on Jan. 4, 2010, the contents of all of which are hereby incorporated herein by reference.

The present invention relates to a method and a device for detecting presence of an object. In particular the invention relates to detecting presence of an object by means of influencing propagation of light by means of the object and detecting resulting change of light arriving to a detector.

WO/2009/086836 discloses a device for detecting position of an object touching the device. The position is detected by means of disturbing light guided by the device from a light source towards a detector and detecting the resulting change of light arriving to the detector. It is of importance that the object may disturb or influence light propagation for the device described above. Guidance of light is furthermore disclosed in US 2008/0278460.

Accordingly, there is a need for an improved detection of presence of an object. Thus, it is an object of the present invention to provide an improved detection of presence of an object.

According to a first aspect of the present invention, a device for detecting presence of an object at the device is provided. The device comprises a first redirecting structure comprising a first primary redirecting structure, and a second redirecting structure comprising a second primary redirecting structure. The device may furthermore comprise a light source and a light detector device or the device may be adapted to receive light from a source and return light to a detector. The light source is adapted to emit light towards the first primary redirecting structure. The first primary redirecting structure is adapted to redirect light from the light source towards the second primary redirecting structure. The second primary redirecting structure is adapted to return light from the first primary redirecting structure back towards the first primary redirecting structure. The first primary redirecting structure is adapted to redirect light from the second primary redirecting structure towards the light detector device. During operation of the device, the device forms a sensing zone comprising a first sensing zone formed by light propagating between the first primary redirecting structure and the second primary redirecting structure.

Due to the second primary redirecting structure being adapted to return light from the first primary redirecting structure back towards the first primary redirecting structure, the device may be adapted for having a light beam traversing the sensing zone twice. Consequently, the effect that the object may have on a light beam traversing the sensing zone may be improved. Thus, the present invention may facilitate detecting presence of the object at the device.

According to a second aspect of the present invention, a method for detecting presence of an object is provided. The method comprises emitting light from a light source towards a first primary redirecting structure. The method furthermore comprises redirecting, by means of the first primary redirecting structure, light from the light source towards a second primary redirecting structure. The method furthermore comprises returning, by means of the second primary redirecting structure, light from the first primary redirecting structure back towards the first primary redirecting structure. The method furthermore comprises redirecting, by means of the first primary redirecting structure, light from the second primary redirecting structure towards the light detector device. The method furthermore comprises forming a first sensing zone by means of light propagating between the first primary redirecting structure and the second primary redirecting structure.

Due to returning light from the first primary redirecting structure back towards the first primary redirecting structure, by means of the second primary redirecting structure, a light beam may traverse the sensing zone twice. Consequently, the effect that the object may have on a light beam traversing the sensing zone may be improved. Thus, the present invention may facilitate detecting presence of an object.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

The figures are schematic and simplified for clarity, and they may merely show details which are essential to the understanding of the invention, while other details may have been left out. Throughout, the same reference numerals are used for identical or corresponding parts.

Figure 1:
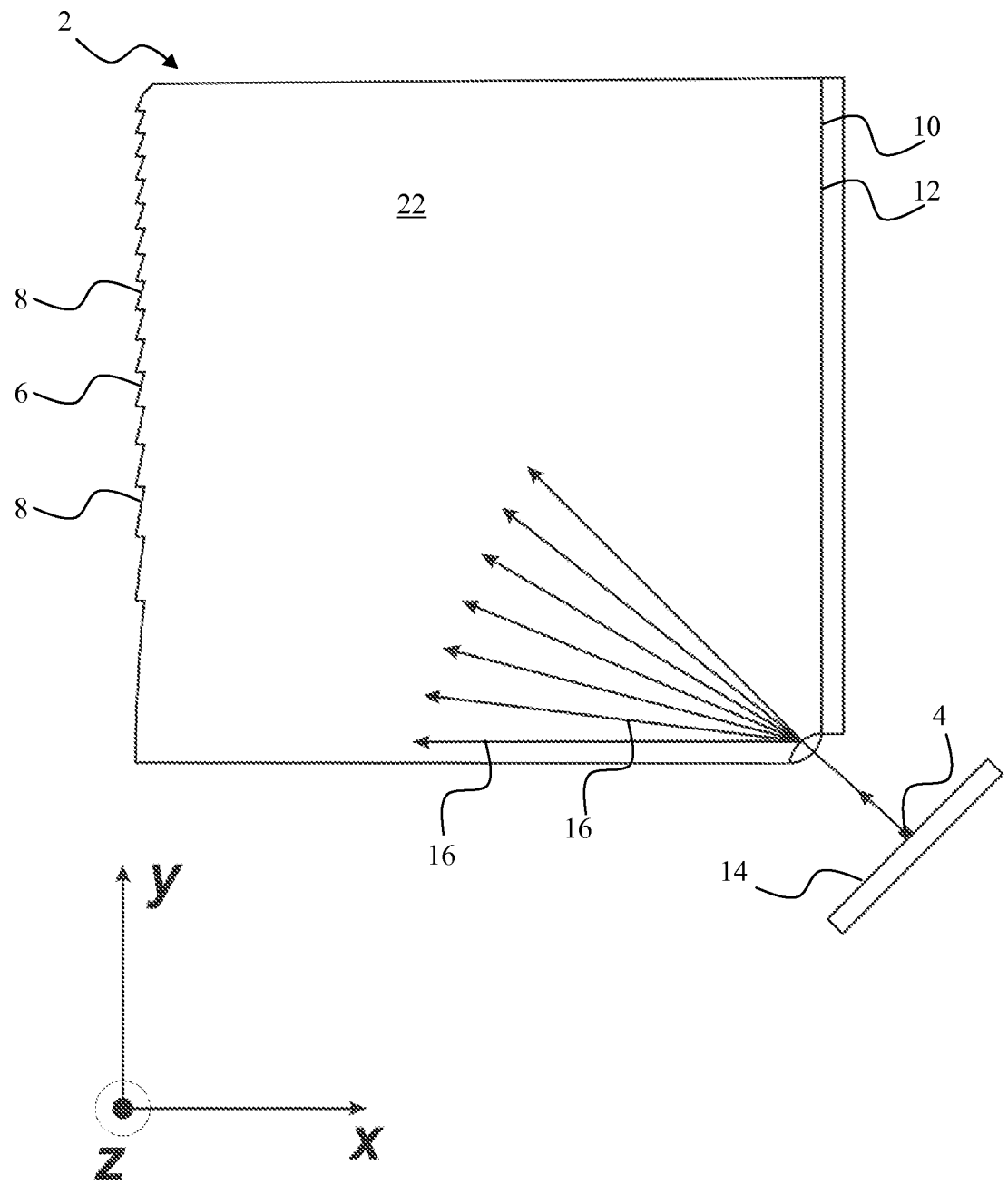
FIGS. 1-4 schematically illustrate a first embodiment of a device according to the present invention seen from above, FIG. 5 schematically illustrates a perspective view of a part of the first embodiment, FIGS. 6-10 schematically illustrate a second embodiment of a device according to the present invention seen from above, FIGS. 11-14 schematically illustrate cross sectional views of an embodiment of a device according to the present invention, FIGS. 15-16 schematically illustrate cross sectional view of an embodiment of a device according to the present invention, FIG. 17 schematically illustrates a third embodiment of a device according to the present invention seen from above, FIG. 18 schematically illustrates the third embodiment seen from the side, FIG. 19 schematically illustrates a method according to the present invention, and FIG. 20 schematically illustrates an embodiment of a device according to the present invention seen from above.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and sufficient, and will fully convey the concept of the invention to those skilled in the art.

DETAILED DESCRIPTION

Embodiments according to the present invention may be adapted to guide light by means of a planar waveguide substantially as disclosed in WO/2009/086836. Furthermore, estimation of presence of an object or of a contact point between the object and the device may be carried out in a manner similar to what is disclosed in WO/2009/086836.

In general, the object is sensed by the device by means of the object disturbing, i.e. e.g. blocking or changing the propagation path of light, which light is propagating from the light source towards the detector device and which light is guided by the device from the light source towards the detector. By detecting change in light intensity and/or distribution arriving to the detector array, presence and possibly position of the object may be derived.

The second redirecting structure may comprise a reflecting structure such as retroreflecting structure and/or a structure functioning as a retroreflecting structure. A retroreflecting structure may comprise one or more cornor reflectors and/or one or more corner-like reflectors and/or any other known retroreflecting structure. Having a retroreflecting structure and/or a structure functioning as a retroreflecting structure may provide that light may propagate back and forth (i.e. e.g. from the first redirecting structure to the second redirecting structure and back towards the first redirecting structure) along substantially the same path, i.e. e.g. back and forth along substantially parallel paths. Thus, the second redirecting structure may by configured to return light from the first primary redirecting structure back towards the first primary redirecting structure along substantially the same path and/or a substantially parallel path as the incident light. The second redirecting structure may comprise a mirror, such as a plane mirror. Having a plane mirror may provide a simple construction, which may be less complicated to produce and may be cheaper to produce. It is evident that a plane mirror may function as a retroreflecting structure for light being incident on the plane mirror at an angle of incidence of 0 degrees, i.e. for light propagating towards the plane mirror along a normal to the plane mirror. Thus, the device according to the present invention may be configured such that light from the first redirecting structure is incident on the second redirecting structure at an angle of incidence of 0 degrees or substantially 0 degrees.

The second secondary redirecting structure may be provided in form of a retroreflecting structure having a sawtooth-like structure forming a plurality of corner-like reflectors. Each corner-like reflector may comprise two plane mirror structures forming a mutual angle of 90 degrees. The sawtooth-like structure may form a plane along the z-axis stretching from a first surface to a second surface of a waveguide of the device.

In general, the dimensions of the corner-like reflectors may be such that the distance from top to top of the sawtooth-like structure is from 1 µm to 10 mm, such as from 100 to 500 µm.

A retroreflecting structure may be provided in any other known way, such as by a plurality of three or six reflecting surfaces.

An advantage of having the second redirecting structure comprising a retroreflecting structure and/or a structure functioning as a retroreflecting structure may be that the light source and light detector device may be placed next to each other.

An advantage of having the second redirecting structure comprising a retroreflecting structure and/or a structure functioning as a retroreflecting structure may be that an (possible unintended) misalignment of the first redirecting structure is accounted for such that light from the light source may be guided towards the detector device.

The first redirecting structure may comprise a reflecting structure. The reflecting structure may comprise a prism structure or a mirror structure. The reflecting structure may comprise a parabolic structure, which may have a focal point that substantially coincide with a position of the detector device and/or the light source. The focal point may alternatively or additionally coincide with a corner of the device and/or a corner of a planar waveguide of the device. A parabolic structure may redirect diverging light, e.g. from the light source, into collimated light. A parabolic structure may redirect collimated light, e.g. from the second redirecting structure, into converging light.

The first redirecting structure may comprise a plurality of redirecting elements, e.g. a plurality of prism structures or parabolic structures. This may provide a more compact structure.

The first redirecting structure may comprise a diffractive structure, such as a grating or a hologram. This may provide a compact structure.

The first redirecting structure may comprise a first secondary redirecting structure. The second redirecting structure may comprise a second secondary redirecting structure. The light source may be adapted to emit light towards the first secondary redirecting structure. The first secondary redirecting structure may be adapted to redirect light from the light source towards the second secondary redirecting structure. The second secondary redirecting structure may be adapted to return light from the first secondary redirecting structure back towards the first secondary redirecting structure. The first secondary redirecting structure may be adapted to redirect light from the second secondary redirecting structure towards the light detector device. The sensing zone may comprise a second sensing zone formed by light propagating between the first secondary redirecting structure and the second secondary redirecting structure. Light propagating between the first secondary redirecting structure and the second secondary redirecting structure may intersect light, e.g. at a right angle, propagating between the first primary redirecting structure and the second primary redirecting structure, such that the first sensing zone and the second sensing zone mutually overlap. Having intersecting light may facilitate detection of a position of the object in relation to the device.

The device may comprise a planar waveguide. The planar waveguide may be adapted for guiding light propagating from the light source towards the first redirecting structure. The planar waveguide may be adapted for guiding light propagating from the first redirecting structure towards the light detector device. The planar waveguide may have a first surface and a second surface. The first surface and the second surface may be located on opposite sides of the waveguide.

The first and second surface may be parallel.

The planar waveguide may be configured for guiding light by means of total internal reflection at the first and second surface.

Due to the first and second surface, the second redirecting structure (the second primary and/or the second secondary redirecting structure) in form of a mirror, such as a plane mirror, may function as a retroreflecting structure for light propagating along a path that when projected onto the first or second surface of the waveguide forms an angle of incidence of 0 degrees on the second redirecting structure. Thus, the device according to the present invention may be configured such that light from the first redirecting structure is incident on the second redirecting structure at an angle of incidence of 0 degrees or substantially 0 degrees when seen projected onto the first or second surface of the waveguide.

Provision of the second redirecting structure comprising a retroreflecting structure and/or a structure functioning as a retroreflecting structure may provide that light may propagate back and forth (i.e. from the first redirecting structure to the second redirecting structure and back towards the first redirecting structure) along substantially the same path and/or substantially parallel paths when seen projected onto the first and/or second surface of the waveguide.

Thus, the second redirecting structure may by configured to return light from the first primary redirecting structure back towards the first primary redirecting structure along substantially the same path and/or a substantially parallel path as the incident light when seen projected onto the first and/or second surface of the waveguide.

The light source and the light detector device may be adjacent in relation to the redirecting structures, such as being juxtaposed or being situated on top or next to of each other. The light source and the light detector device may be situated at the same side or corner of the waveguide. Having adjacent light source and light detector device may provide a more compact construction.

The first redirecting structure may comprise a reflecting structure having a surface forming an angle relative to the first surface within a range of 60°-89°, such as an angle within a range of 70°-86°, such as an angle within a range of 76°-82°. This may facilitate that light guided by the waveguide may only be disturbed when propagating along specific part(s) of a path from the light source towards the detector, such as only when propagating between the first redirecting structure and the second redirecting structure.

The planar waveguide may be adapted for guiding light between the first redirecting structure and the second redirecting structure, e.g. such that at least part of the first surface is within the sensing zone. Thus, touching the first surface with the object may disturb the light.

The planar waveguide may comprise a first planar waveguide layer next to the first surface. The planar waveguide may comprise a second planar waveguide layer next to the second surface. The first waveguide layer may be adapted for guiding light between the first redirecting structure and the second redirecting structure. The second waveguide layer may be adapted for guiding light propagating from the light source towards the first redirecting structure. The second waveguide layer may be adapted for guiding light propagating from the first redirecting structure towards the light detector device. Having a waveguide with a first and a second layer may provide that different parts of light path may be separated, thus facilitating that the light may only be disturbed when propagating along specific part(s) of the path.

The device may be adapted such that light propagating between the first redirecting structure and the second redirecting structure propagates at least partly in the medium, such as air, bordering the device. This may facilitate that positioning of the object at the device, such as slightly separated from the device, may disturb light guided by the device.

The emission of light from the light source into the planar waveguide may be adapted such that light guided by the planar waveguide has an angle of incidence relative to the first surface causing that the light may be not disturbed by water contacting the first surface.

The emission of light from the light source into the planar waveguide may be adapted such that light guided by the planar waveguide has an angle of incidence relative to the first surface causing that light, which may be disturbed by the intended object, may not be disturbed by a material having a refractive index that is at least five percent lower than the refractive index of the object, such as at least 10 percent lower, when the material contacts the first surface.

The first redirecting structure may be adapted such that light guided by the planar waveguide changes angle of incidence relative to the first surface after being redirected by the first redirecting structure. This may facilitate that light guided by the waveguide may only be disturbed when propagating along specific part(s) of a path from the light source towards the detector, such as only when propagating between the first redirecting structure and the second redirecting structure.

The angle of incidence may be changed such that light guided by the planar waveguide from the light source towards the first redirecting structure cannot be disturbed by the object, and such that after being redirected by the first redirecting structure the redirected light may be disturbed by the object when guided by the planar waveguide from the first redirecting structure towards the second redirecting structure. This may facilitate an improved detection of the object.

The first redirecting structure and the second redirecting structure may be integrated in opposite ends of the planar waveguide. This may facilitate production of the device. At least parts of end parts of the planar waveguide may form redirecting structures. These parts may be coated, e.g. for providing a reflective surface.

The planar waveguide may comprise a concave surface for receiving light from the light source and directing the received light towards the first redirecting structure. The light source may be spaced from the receiving part of the planar surface, e.g. the concave surface. This feature may facilitate spreading light from the light source, which light may be have a narrow low-divergence beam, within the planar waveguide towards the first redirecting structure.

The planar waveguide may comprise a convex surface for receiving light from the first redirecting structure and directing the received light towards the light detector device. The light detector device may be spaced from the part of the planar waveguide, e.g. the convex surface, which may direct light towards the detector device. This feature may facilitate spreading of light to the light detector device, which in turns may facilitate detection of changes in the light received by the light detector device.

The concave surface and convex surface may be situated on top of or next to each other. The convex surface may have a smaller dimension along a direction perpendicular to the first surface of the waveguide.

The width of the light detector device may be at least 5 times smaller than the width of the second primary redirecting structure, such as at least 10 times smaller than the width of the second primary redirecting structure, such as at least 15 times smaller than the width of the second primary redirecting structure. This may enable a device that is cheaper to produce.

A system for detecting presence of an object at the device according to the present invention may comprise the object for disturbing light propagating in the sensing zone. The object may for instance be an elongate member, such as a pen, having a refractive index, at least at a tip of the elongate member, which refractive index may be adapted to the refractive index of a surface of the waveguide, such that the elongate member may disturb light in the sensing zone. This may facilitate provision of a device or a system according to the present invention having a higher accuracy and/or a higher resolution for detection of position of the object.

The device may comprise a processor connected to the light detector device for deriving information of presence of the object. This may e.g. facilitate estimation of position of the object.

The device may be adapted for user input for a device, e.g. a laptop or a handheld device such as a device comprising at least one of: a remote control, a mobile phone, a pda, and a portable music player.

The device may be part of a touch screen, e.g. incorporated in an optical table or a handheld device such as a handheld device comprising at least one of a mobile phone, a pda, and a portable music player.

The device according to the present invention is adapted for detecting presence of an object at the device. The device may be adapted for detection of position of the object within the sensing zone. The device may be adapted for detection of a two-dimensional position of the object in relation to a plane in the sensing zone, e.g. in relation to a surface of the device such as the first surface of planar waveguide referred to below.

The device comprises a light source or is adapted to receive light from a light source. The light source may for instance comprise a laser. The light source may be a so-called point source. Light propagating directly from the light source may e.g. be diverging or may propagate along a narrow path.

Light propagating between the first primary redirecting structure and the second primary redirecting structure may be collimated. This may facilitate detection of position of the object.

The first primary redirecting structure and possibly the second primary redirecting structure may be illuminated by the light from the light source. This may facilitate a large and/or substantially continuous sensing zone.

The device comprises a light detector device or is adapted to emit light towards a light detector device. The light detector device may for instance comprise a CMOS device.

The presence and/or position of the object may be caused by the object disturbing light. A disturbance may cause that light deviate from its path causing a different distribution and/or intensity of light arriving to the detector device, which difference may correspond to the position of the object.

The device has a sensing zone comprising a first sensing zone formed by light propagating between the first primary redirecting structure and the second primary redirecting structure. The sensing zone may be an area, e.g. at least a part of the first surface of the waveguide. The sensing zone may be a volume, e.g. a volume next to the device between the first redirecting structure and the second redirecting structure.

FIG. 1 schematically illustrates a top view of a first embodiment of a device 2 for detecting presence of an object (not illustrated) at the device. The device 2 comprises a light source 4, a first redirecting structure 6 comprising a first primary redirecting structure 8, a second redirecting structure 10 comprising a second primary redirecting structure 12, and a light detector device 14.

The light source 4 is adapted to emit light 16 towards the first primary redirecting structure 8. The device 2 is configured such that the first redirecting structure 8 is illuminated by light 16 from the light source 4, but for the sake of simplicity only a few paths of light 16 are schematically illustrated in FIG. 1.

Figure 2:
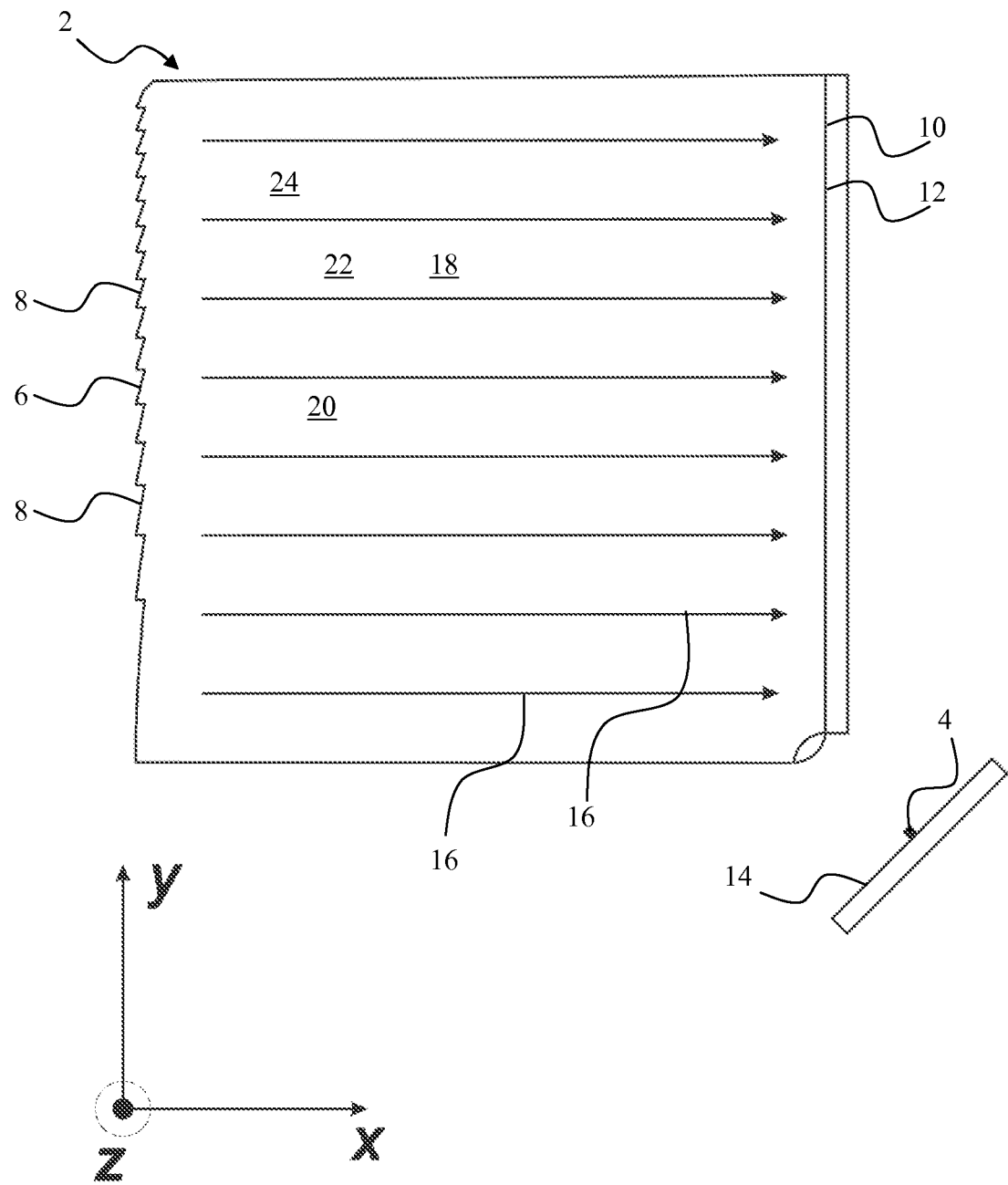

The first primary redirecting structure 8 is adapted to redirect light 16 from the light source 4 towards the second primary redirecting structure 12. Light 16 propagating from the first primary redirecting structure 8 towards the second primary redirecting structure 12 is illustrated in FIG. 2.

The second primary redirecting structure 12 is adapted to return light 16 from the first primary redirecting structure 8 back towards the first primary redirecting structure 8. Light 16 propagating from the second primary redirecting structure 12 towards the first primary redirecting structure 8 is illustrated in FIG. 3.

The second primary redirecting structure 12 comprises a retroreflecting structure. The retroreflecting structure is provided by means of a plane mirror having a reflecting surface. The reflective surface is adapted such that it forms a line if projected into the xz-plane.

Figure 4:
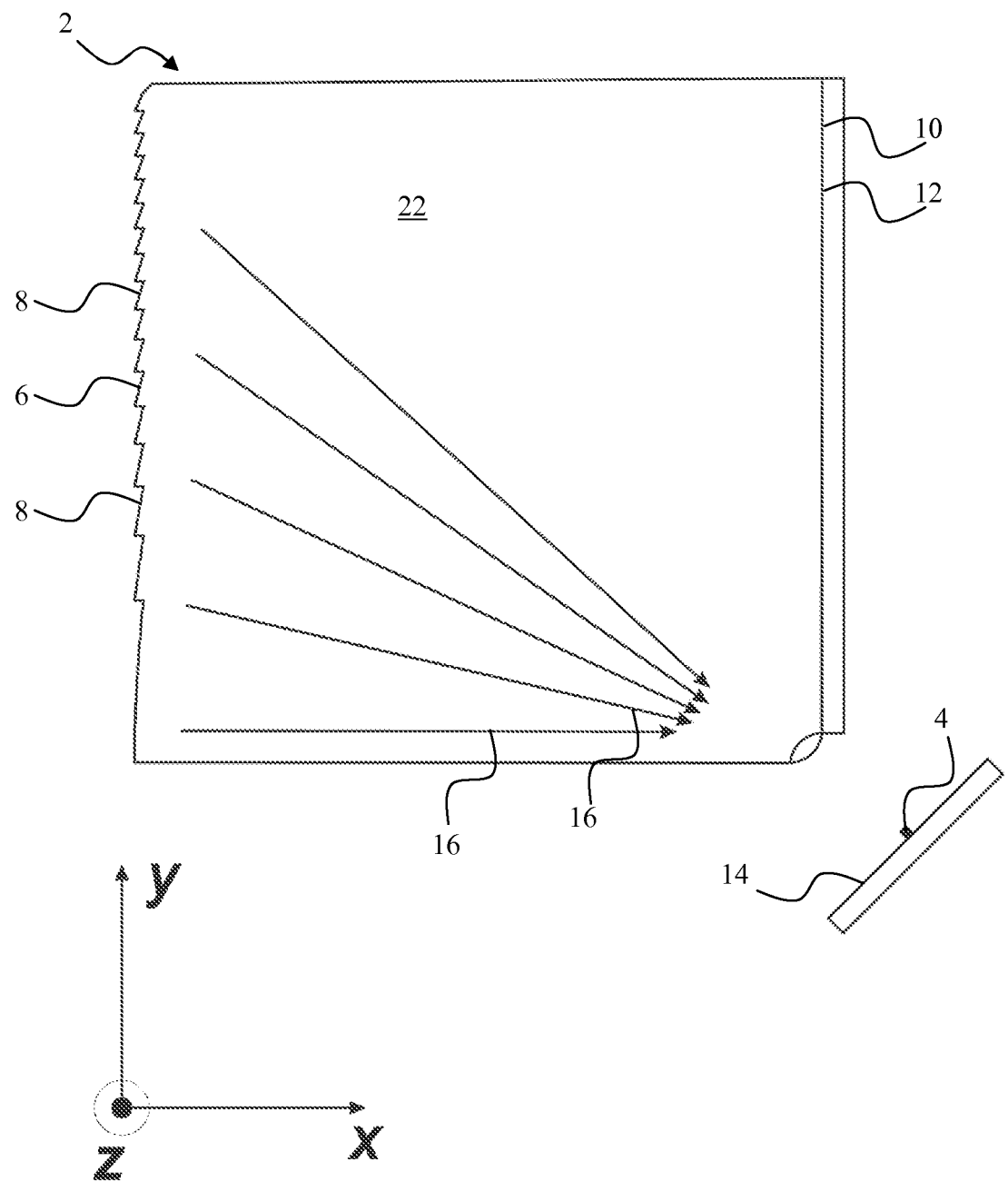

The first primary redirecting structure 8 is adapted to redirect light 16 from the second primary redirecting structure 12 towards the light detector device 14. Light 16 propagating from the first primary redirecting structure 8 towards the detector device 14 is illustrated in FIG. 4.

Figure 3:
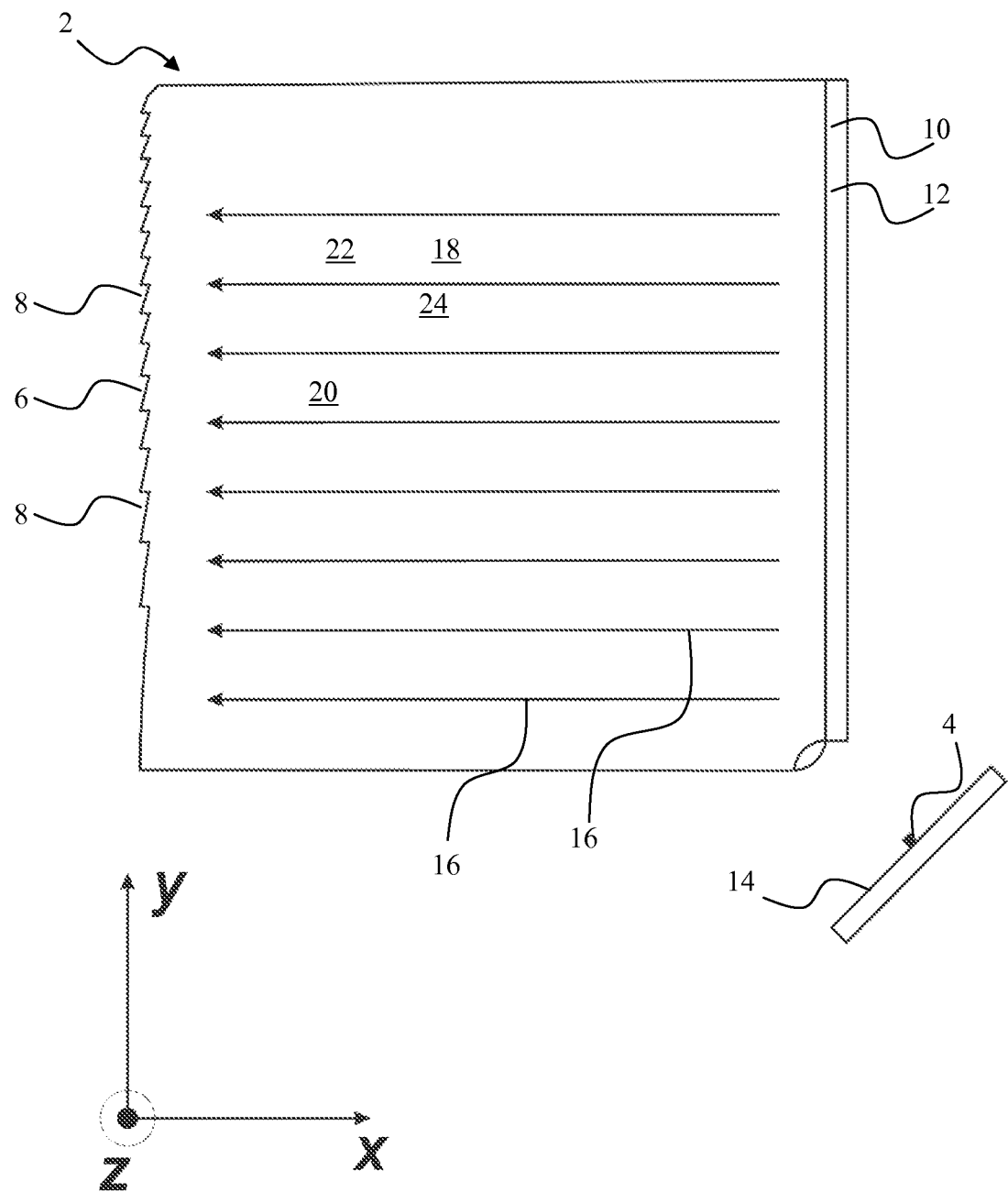

The device 2 has a sensing zone 18 comprising a first sensing zone 20 formed by light 16 propagating between the first primary redirecting structure 8 and the second primary redirecting structure 12, see FIGS. 2 and 3.

The device 2 comprises a planar waveguide 22 adapted for guiding light 16 propagating from the light source 4 towards the first redirecting structure 6, and for guiding light propagating from the first redirecting structure 6 towards the light detector device 14. The planar waveguide 22 has a first surface 24 and a second surface. The second surface is on the opposite side of the waveguide than the first surface 24. The planar waveguide 22 is adapted for guiding light 16 between the first redirecting structure 8 and the second redirecting structure 10, such that at least part of the first surface 24 is within the sensing zone 18. The width of the light detector device 14 is smaller than the width of the second primary redirecting structure 12.

Figure 5:
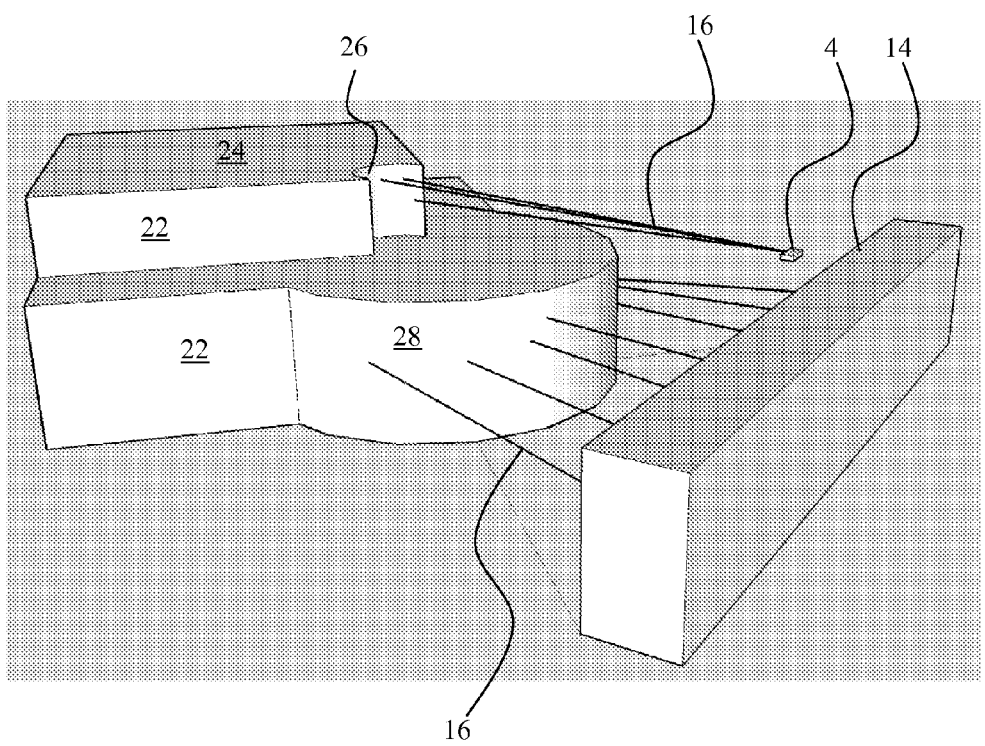
Figure 6:
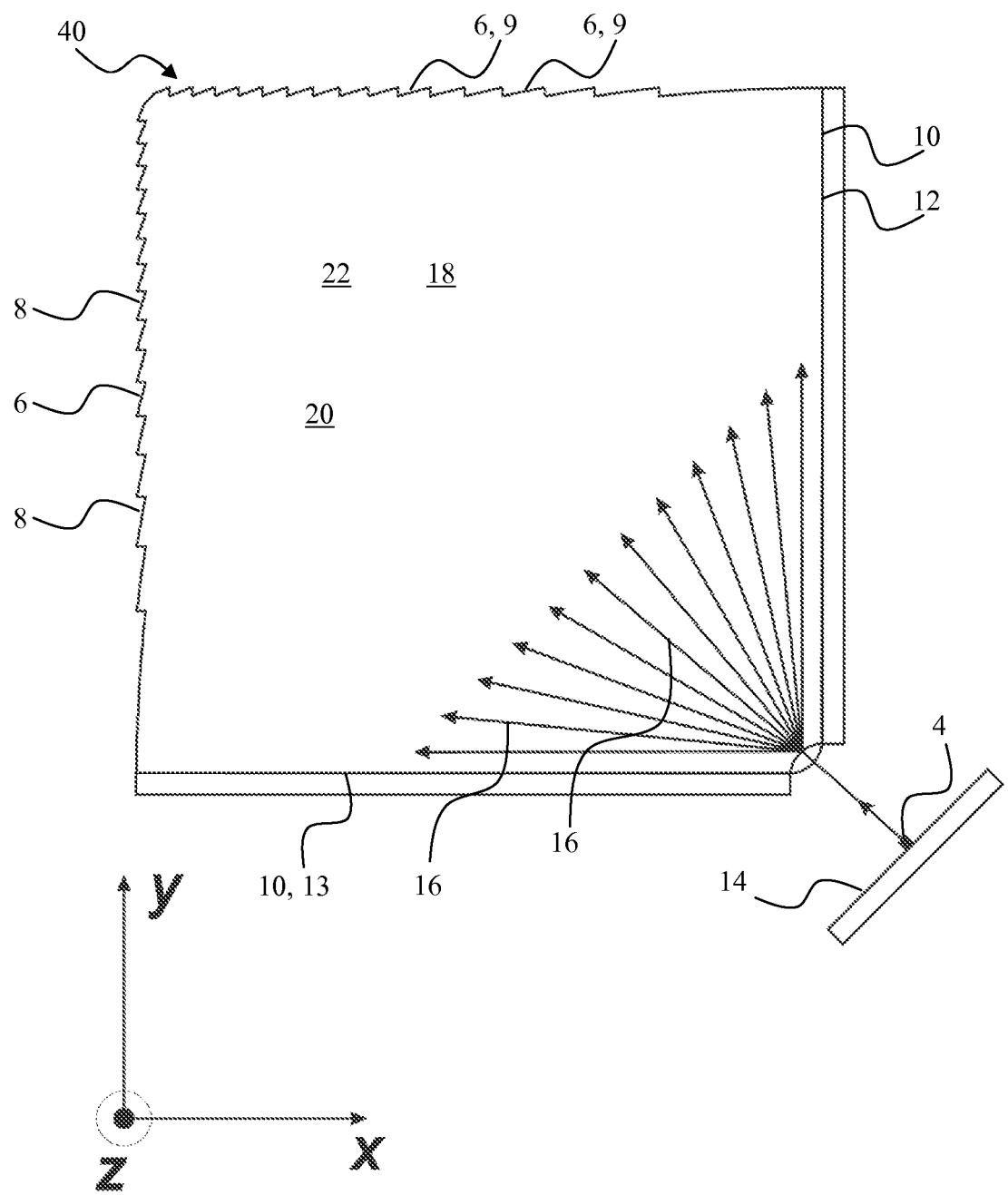

FIG. 5 schematically illustrates a perspective view of a part of the first embodiment showing the light source 4, the detector device 14 and a part of the planar waveguide 22. The planar waveguide 22 comprises a concave surface 26 for receiving light 16 from the light source 4 and directing the received light towards the first redirecting structure (not shown in FIG. 5). The planar waveguide 22 comprises a convex surface 28 for receiving light 16 from the first redirecting structure (not shown in FIG. 5) and directing the received light towards the light detector device 14. The concave surface 26 and convex surface 28 are situated on top of each other. The light source 4 and the light detector device 14 are adjacent in relation to the redirecting structures. The light source 4 is spaced from the concave surface 26. The light detector device 14 is spaced from the convex surface 28.

Figure 7:
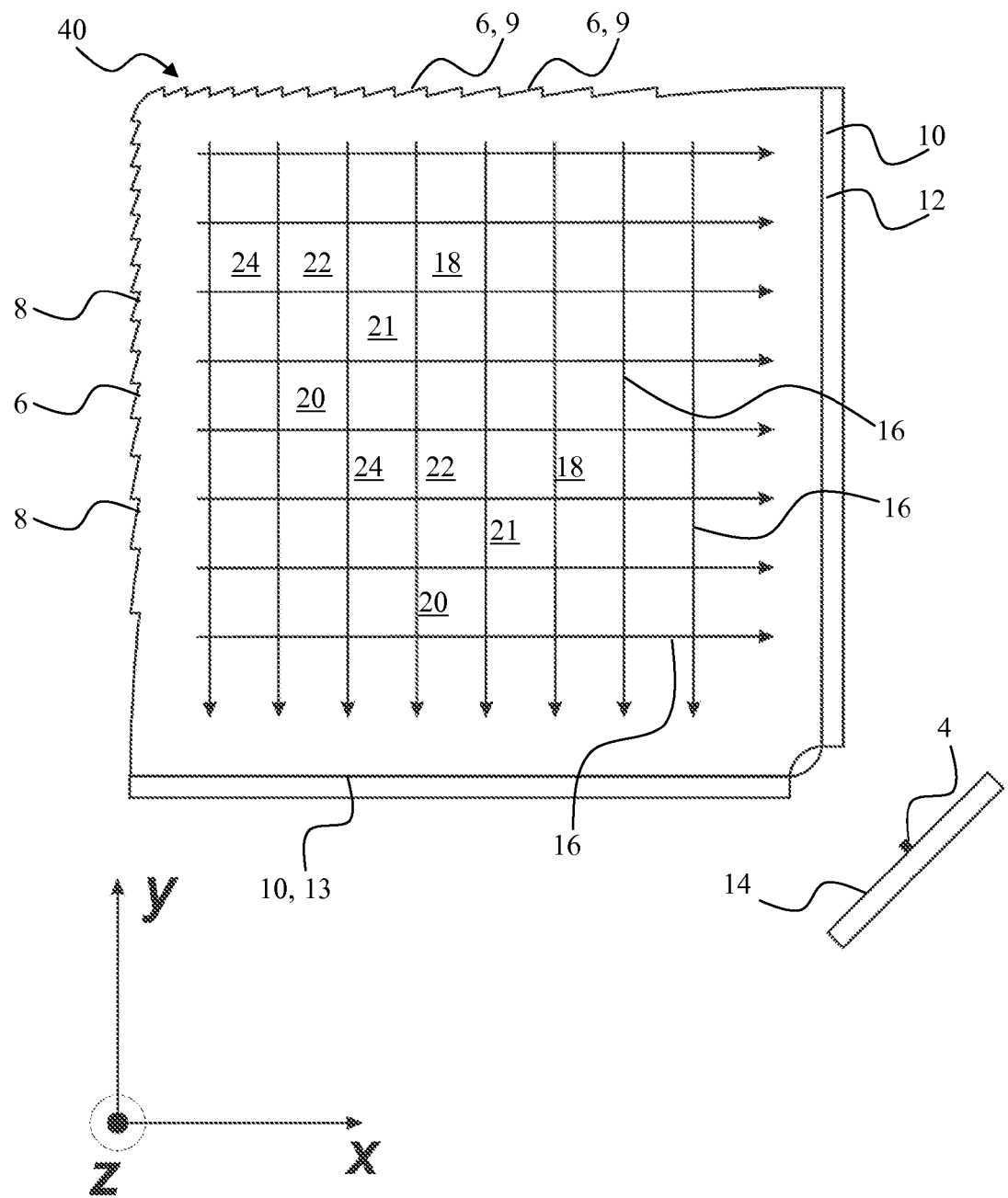

FIGS. 6-10 schematically illustrate top views of a second embodiment of a device 40 according to the present invention for detecting presence of an object (not illustrated) at the device 40. The device 40 comprises a light source 4, a light detector device 14, a first redirecting structure 6, and a second redirecting structure 10. The first redirecting structure 6 comprises a first primary redirecting structure 8 and a first secondary redirecting structure 9. The second redirecting structure 10 comprises a second primary redirecting structure 12 and a second secondary redirecting structure 13. The light source 4 is adapted to emit light 16 towards the first primary redirecting structure 8 and the first secondary redirecting structure 9. The device 40 is configured such that the first redirecting structure 8 (i.e. the first primary redirecting structure 8 and the first secondary redirecting structure 9) is illuminated by light 16 from the light source 4, but for the sake of simplicity only a few paths of light 16 are schematically illustrated in FIG. 7.

The first primary redirecting structure 8 is adapted to redirect light from the light source 4 towards the second primary redirecting structure 12, and the first secondary redirecting structure 9 is adapted to redirect light from the light source 4 towards the second secondary redirecting structure 13, see FIG. 7.

Figure 8:
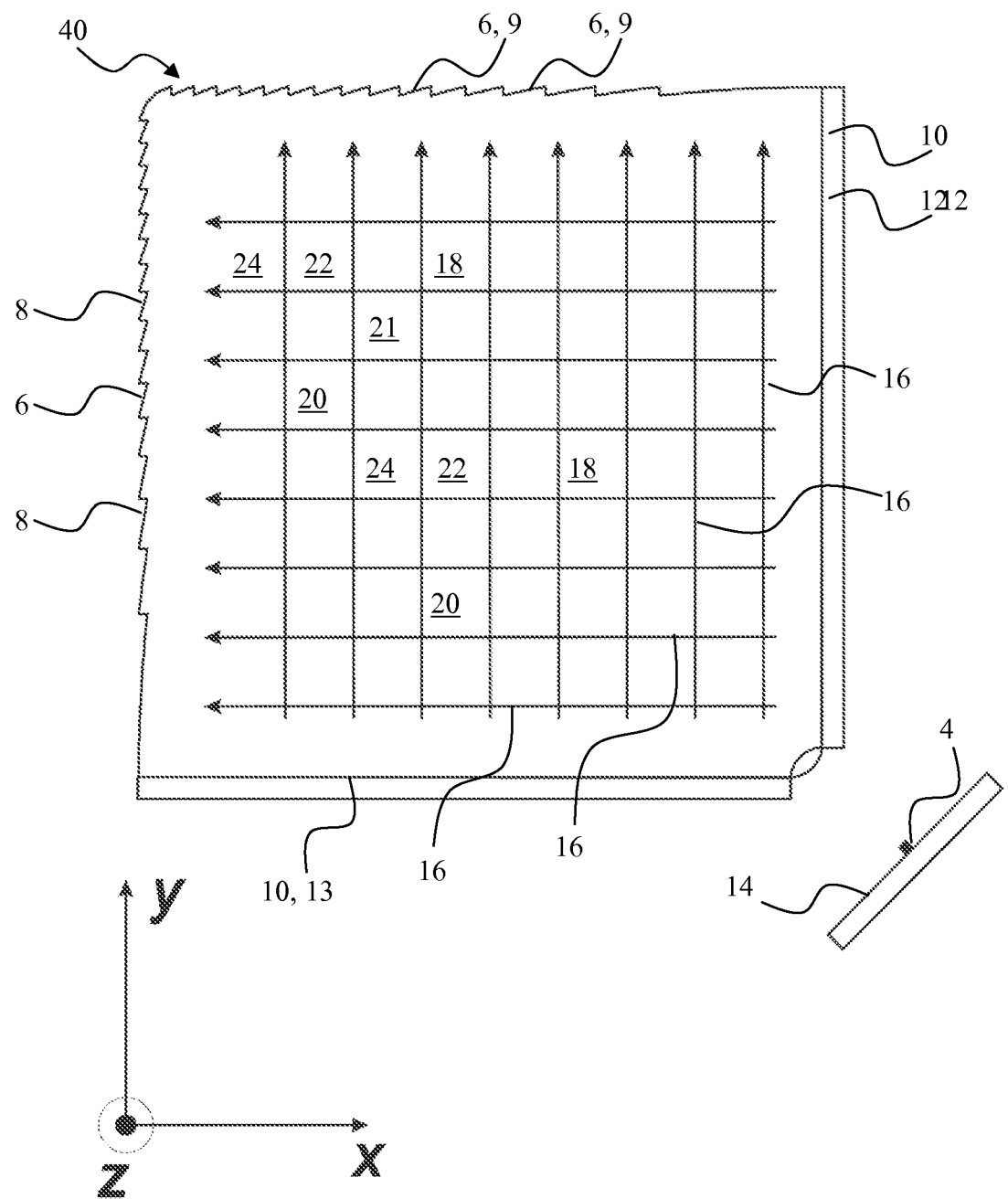

The second primary redirecting structure 12 is adapted to return light 16 from the first primary redirecting structure 8 back towards the first primary redirecting structure 8, and the second secondary redirecting structure 13 is adapted to return light 16 from the first secondary redirecting structure 9 back towards the first secondary redirecting structure 9, see FIG. 8.

The device 40 has a sensing zone 18 comprising a first sensing zone 20 formed by light 16 propagating between the first primary redirecting structure 8 and the second primary redirecting structure 12, and a second sensing zone 21 formed by light 16 propagating between the first secondary redirecting structure 9 and the second secondary redirecting structure 13.

In FIGS. 7 and 8 it is illustrated that light 16 propagating between the first secondary redirecting structure 9 and the second secondary redirecting structure 13 intersects light 16 propagating between the first primary redirecting structure 8 and the second primary redirecting structure 12, such that the first sensing zone and the second sensing zone mutually overlap.

Figure 9:
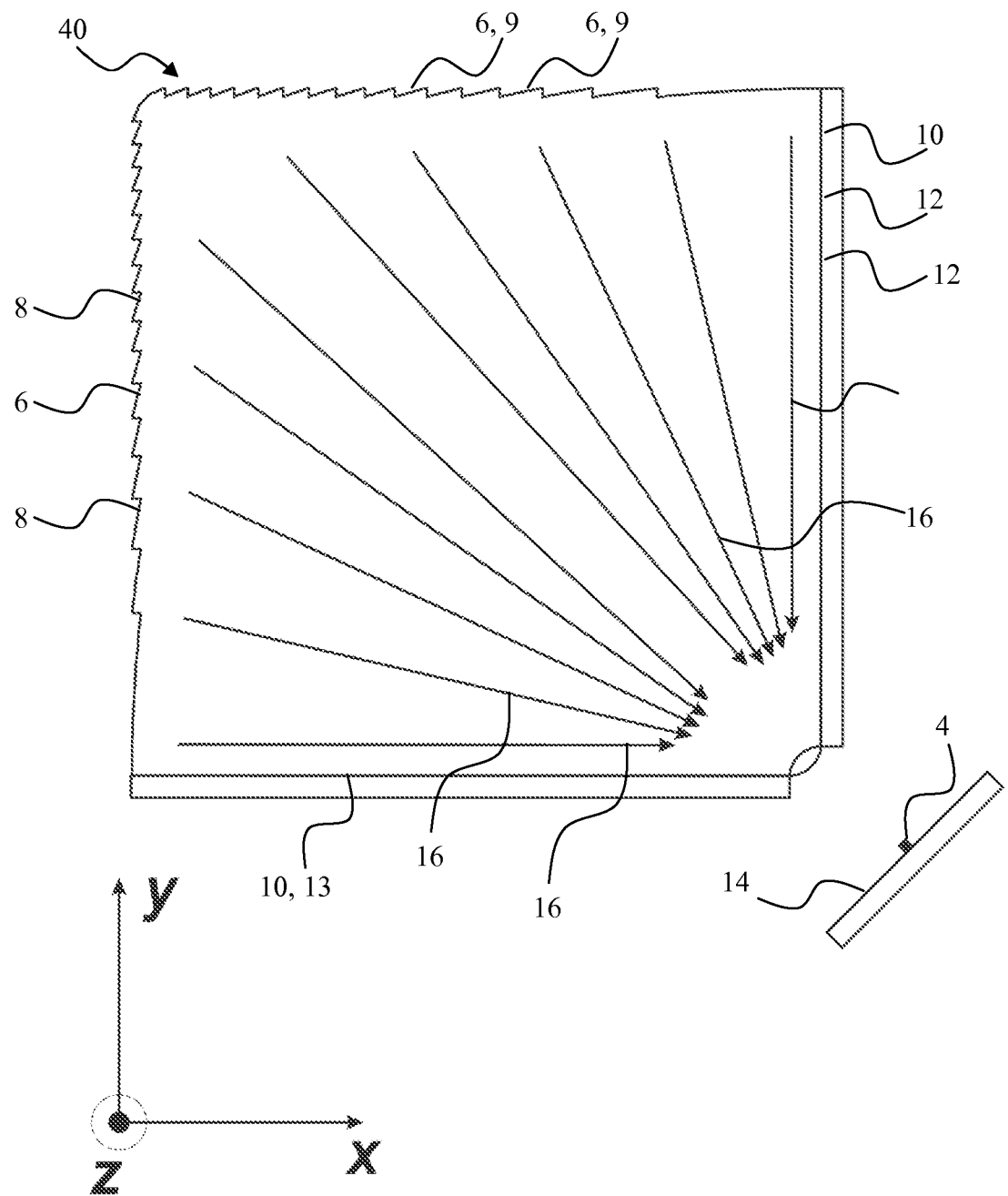

The first primary redirecting structure 8 is adapted to redirect light 16 from the second primary redirecting structure 12 towards the light detector device 14, and the first secondary redirecting structure 9 is adapted to redirect light 16 from the second secondary redirecting structure 13 towards the light detector device 14, see FIG. 9.

Figure 10:
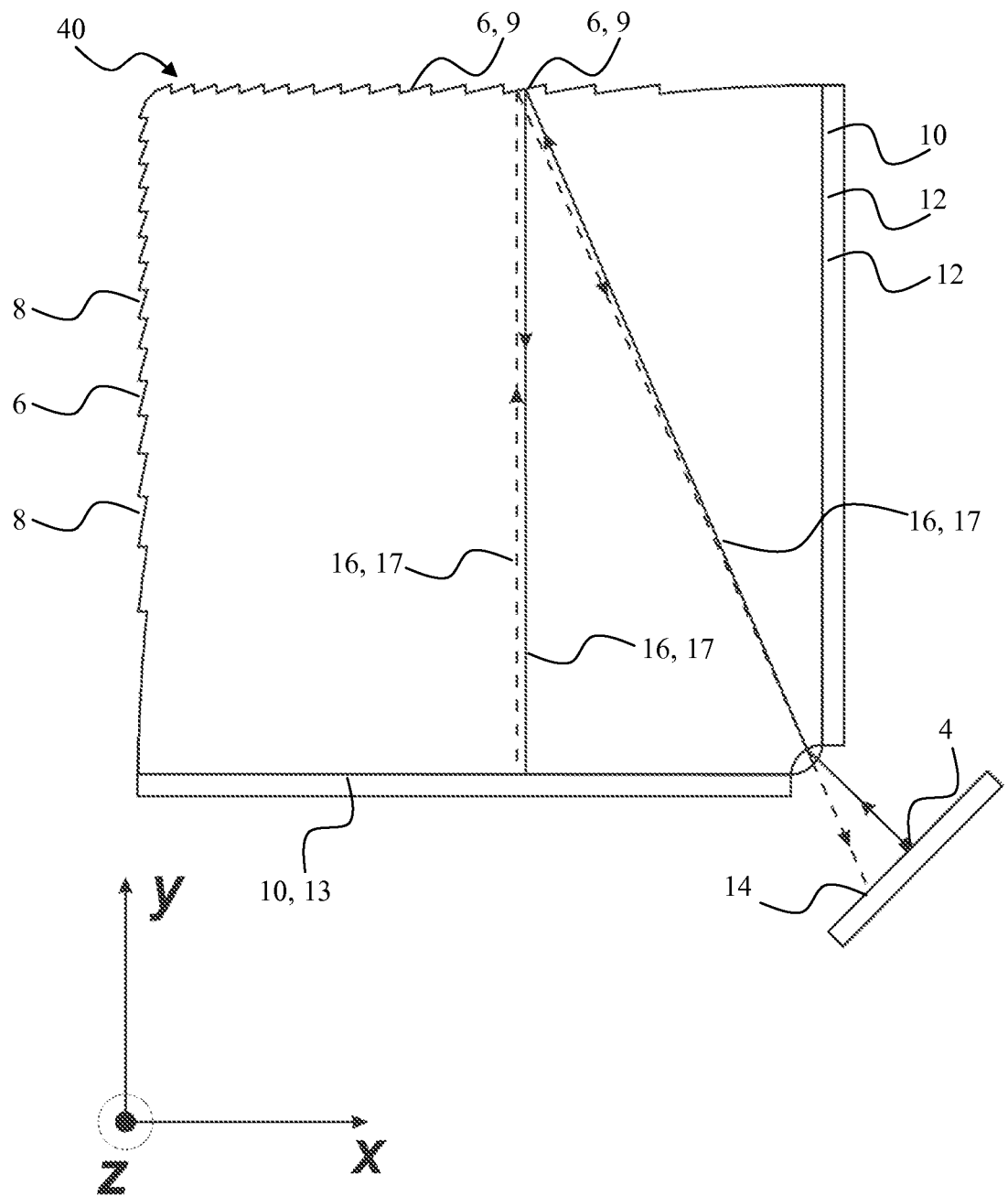
Figure 11:
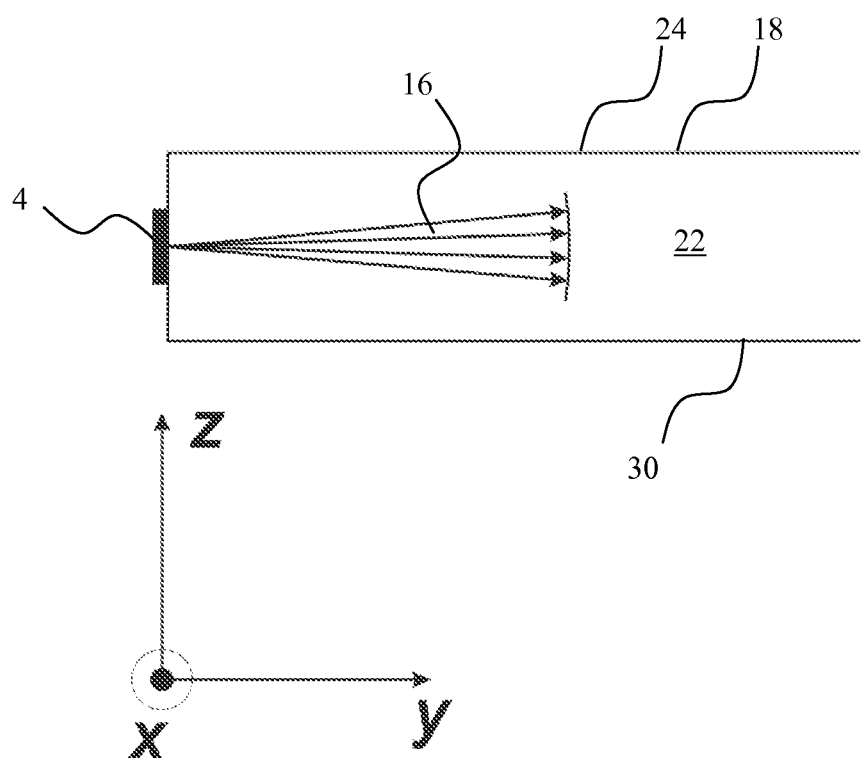

FIG. 10 schematically illustrates the second embodiment of the device 50 with an illustrated light path 17. The second redirecting structure 10 is a retroreflecting structure, but for illustrative purpose, the reflected light 16 is shown slightly displaced in relation to the incoming light at a reflection at the redirecting structure 10.

FIGS. 11-14 schematically illustrate cross sectional views of parts of an embodiment of a device according to the present invention. The illustrated device in FIGS. 11-14 is similar to the illustrated first embodiment and second embodiment. Thus, common reference numbers are used. Furthermore, for the cross sectional views of the device and the light propagation within the device, reference is made to FIG. 10. The device 40 illustrated in FIGS. 11-14 comprises a planar waveguide 22 having a first surface 24 and a second surface 30. The planar waveguide 22 is adapted for guiding light 16 propagating from the light source 4 towards the first redirecting structure 6, between the first redirecting structure 6 and the second redirecting structure 10, and from the first redirecting structure 6 towards the light detector device (not illustrated in FIGS. 11-14). At least part of the first surface 24 is within the sensing zone 18.

Figure 12:
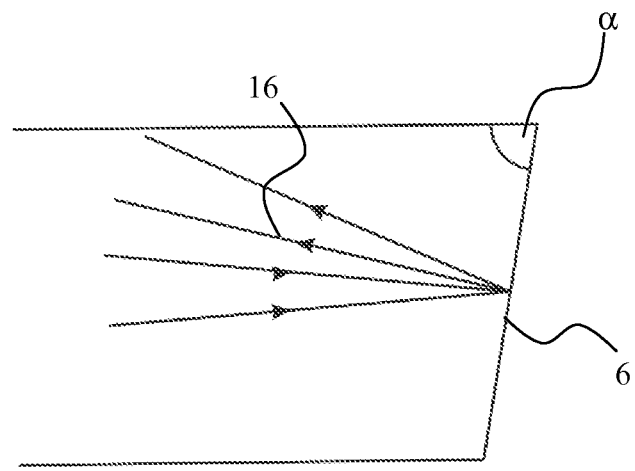
Figure 12:
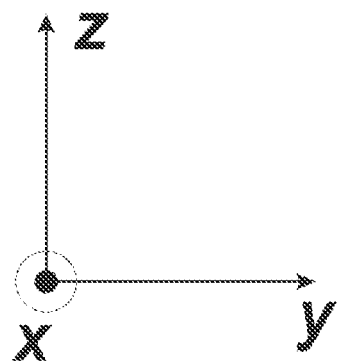
Figure 13:
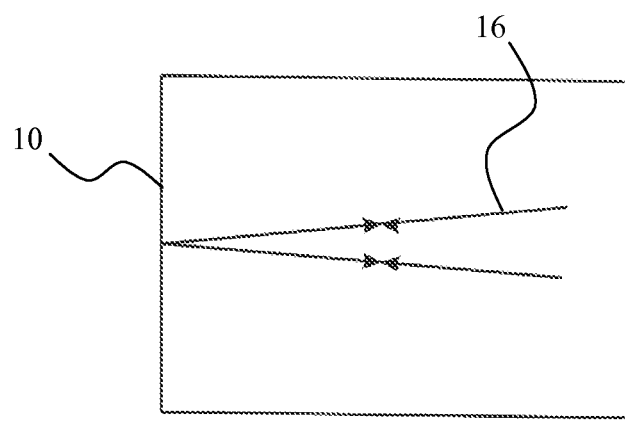
Figure 13:
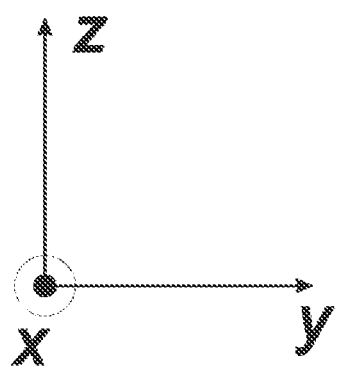
Figure 14:
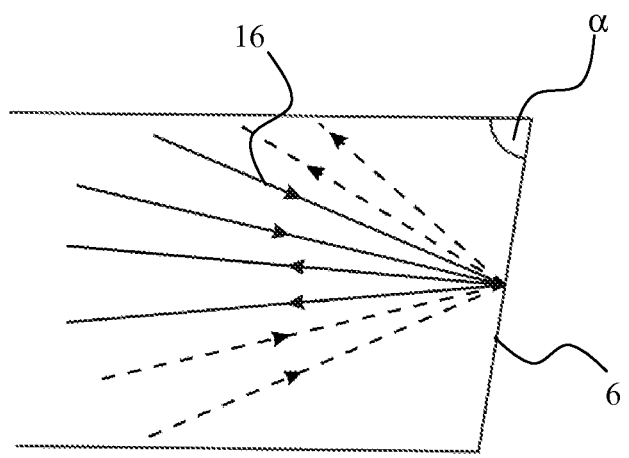
Figure 14:
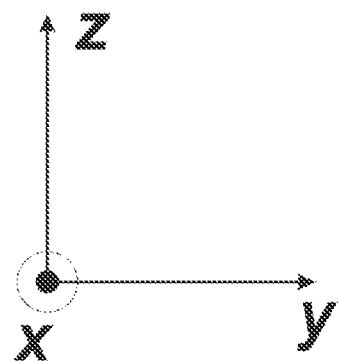

With reference to FIG. 12, the first redirecting structure 6 is adapted such that light 16 guided by the planar waveguide 22 changes angle of incidence relative to the first surface 24 after being redirected by the first redirecting structure 6. The first redirecting structure comprises a reflecting structure having a surface forming an angle a relative to the first surface 24 within around 75°. The angle of incidence of the light 16 is changed such that light 16 guided by the planar waveguide 22 from the light source 4 towards the first redirecting structure 6 cannot be disturbed by the object if the object touches the first surface 24, and such that after being redirected by the first redirecting structure 6 the redirected light 16 may be disturbed by the object when the light 16 is guided by the planar waveguide 22 from the first redirecting structure 6 towards the second redirecting structure 10.

Light is guided by the planar waveguide 22 by means of total internal reflection at the first 24 and second 30 surface.

Figure 15:
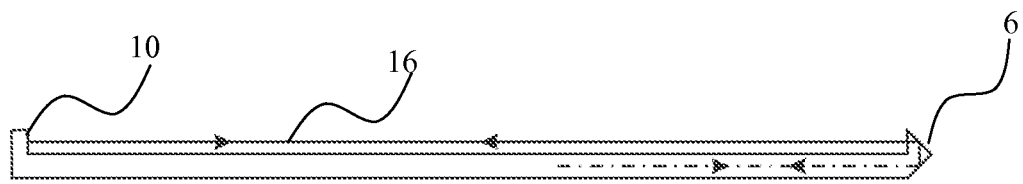
Figure 15:
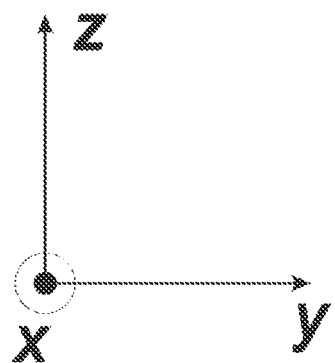
Figure 16:
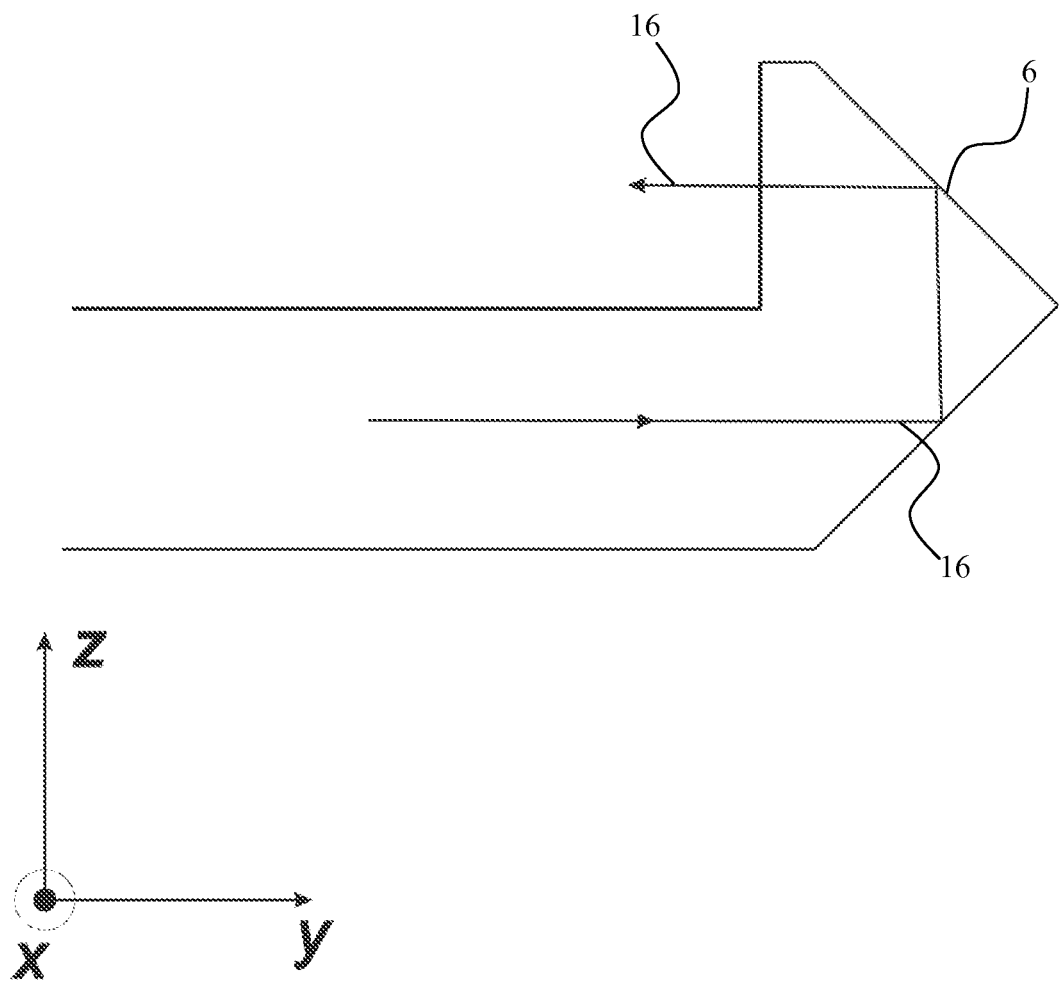

FIG. 15 schematically illustrates a cross sectional view of an embodiment of a device according to the present invention. FIG. 16 illustrates a part of the embodiment shown in FIG. 15. The device is adapted such that light 16 propagating between the first redirecting structure 6 and the second redirecting structure 10 propagates at least partly in the medium, such as air, bordering the device.

Figure 17:
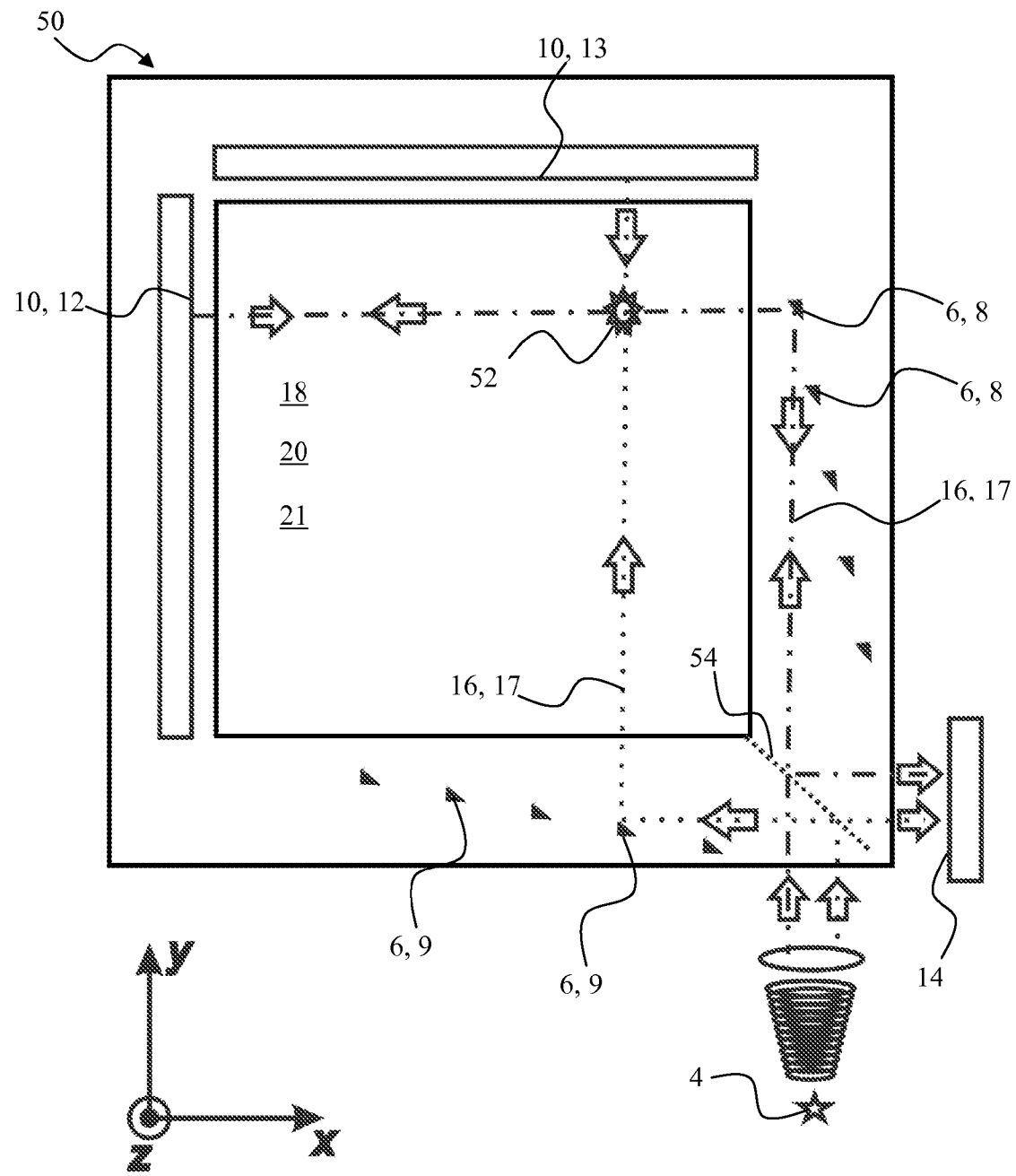

FIG. 17 schematically illustrates top view of a third embodiment of a device 50 according to the present invention for detecting presence of an object 52 at the device 50. The device 50 comprises a light source 4, a light detector device 14, a first redirecting structure 6, and a second redirecting structure 10. The first redirecting structure 6 comprises a first primary redirecting structure 8 and a first secondary redirecting structure 9. The second redirecting structure 10 comprises second primary redirecting structure 12 and a second secondary redirecting structure 13.

The light source 4 is adapted to emit light 16 towards the first primary redirecting structure 8 and towards the first secondary redirecting structure 9. Propagations from the light source 4 towards the two first redirecting structures 8, 9, respectively, are carried out or facilitated by means of a beam splitter 54.

The device 50 is adapted for illumination of the first redirecting structures 8, 9 by means of light 16 from the light source 4, but for the sake of simplicity, only two light paths 17 are illustrated in FIG. 17. One light path 17 illustrates that the first primary redirecting structure 8 is adapted to redirect light 16 from the light source 4 towards the second primary redirecting structure 12. The second primary redirecting structure 12 is adapted to return light 16 from the first primary redirecting structure 8 back towards the first primary redirecting structure 8. The first primary redirecting structure 8 is adapted to redirect light 16 from the second primary redirecting structure 12 towards the light detector device 14. Another light path illustrates that the first secondary redirecting structure 9 is adapted to redirect light 16 from the light source 4 towards the second secondary redirecting structure 13. The second secondary redirecting structure 13 is adapted to return light 16 from the first secondary redirecting structure 9 back towards the first secondary redirecting structure 9. The first secondary redirecting structure 9 is adapted to redirect light 16 from the second secondary redirecting structure 13 towards the light detector device 14. Propagations from the two first redirecting structures 8, 9, respectively, towards the detector device 14 are carried out by means of the beam splitter 54.

A sensing zone 18 is formed by light 16. The sensing zone 18 comprises a first sensing zone 20 formed by light 16 propagating between the first primary redirecting structure 8 and the second primary redirecting structure 12, and a second sensing zone 21 formed by light 16 propagating between the first secondary redirecting structure 9 and the second secondary redirecting structure 13.

Light 16 propagating between the first secondary redirecting structure 9 and the second secondary redirecting structure 13 intersects light 16 propagating between the first primary redirecting structure 8 and the second primary redirecting structure 12, such that the first sensing zone 20 and the second sensing zone 21 mutually overlap.

Figure 18:
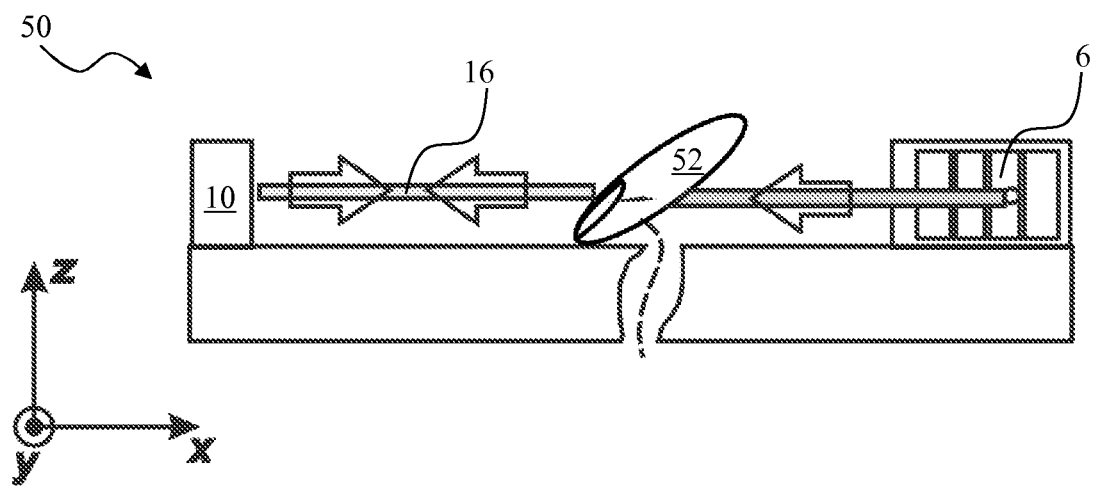

FIG. 18 schematically illustrates the third embodiment of the device 50 as a cut-out seen from the side. The device 50 is adapted such that light 16 propagating between the first redirecting structure 6 and the second redirecting structure 10 propagates in the medium, such as air, bordering the device 50. It is illustrated how an object 52, such as a finger, may physically block light 16.

Figure 19:
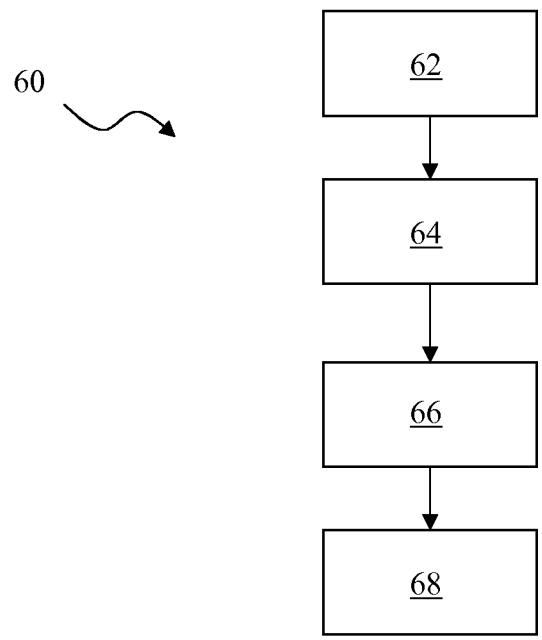

FIG. 19 schematically illustrates a method 60 according to the present invention for detecting presence of an object. The method 60 comprises emitting 62 light from a light source towards a first primary redirecting structure The method 60 comprises redirecting 64, by means of the first primary redirecting structure, light from the light source towards a second primary redirecting structure. The method 60 comprises returning 66, by means of the second primary redirecting structure, light from the first primary redirecting structure back towards the first primary redirecting structure. The method 60 comprises redirecting 68, by means of the first primary redirecting structure, light from the second primary redirecting structure towards the light detector device. The method 60 comprises forming a first sensing zone by means of light propagating between the first primary redirecting structure and the second primary redirecting structure. Detection of presence is carried out by detection of whether light, which propagates from the light source towards the light detector device, is disturbed such that the light deviate from its path causing a different distribution and/or intensity of light arriving to the detector device. The difference in distribution and/or intensity of light detected by the detector device is used for estimating presence and/or position of the object disturbing the light.

Figure 20:
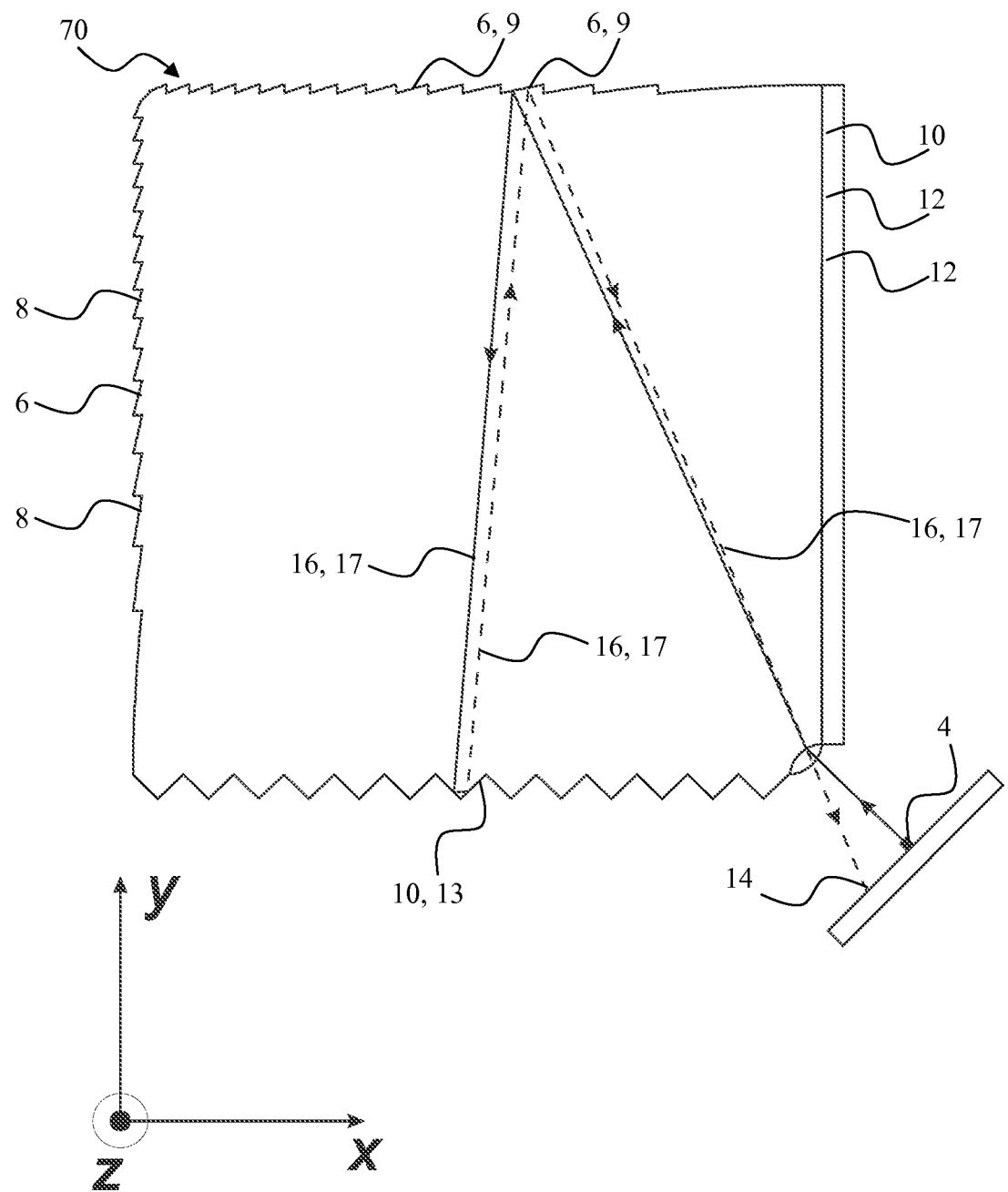

FIG. 20 schematically illustrates an embodiment of a device 70 according to the present invention seen from above. The embodiment 70 illustrated in FIG. 20 is similar to the embodiment 40 illustrated in FIGS. 6-10. Thus, the same reference numerals are used for identical or corresponding parts and reference is made to FIGS. 6-10 for explanation of these parts and explanation of the functioning of these parts.

The device 70 is configured such that the first redirecting structure 8 (i.e. the first primary redirecting structure 8 and the first secondary redirecting structure 9) is illuminated by light 16 from the light source 4, but for the sake of simplicity only a single path 17 of light 16 is schematically illustrated in FIG. 20. The path 17 illustrates light propagating from the light source 4 towards the first secondary redirecting structure 9, which redirect light 16 towards the second secondary redirecting structure 13, which returns light 16 back towards the first secondary redirecting structure 9, which redirect light 16 towards the detector device 14. The arrowheads along the path 17 indicate the direction of propagation of light 16.

A difference between the device 70 and the device 40 is that for the device 70, the second secondary redirecting structure 13 is provided in form of a retroreflecting structure having a sawtooth-like structure forming a plurality of corner-like reflectors. Each corner-like reflector comprises two plane mirror structures forming a mutual angle of 90 degrees. The sawtooth-like structure forms a plane along the z-axis stretching from a first surface to a second surface of a waveguide of the device 70.

In general, the dimensions of the corner-like reflectors may be such that the distance from top to top of the sawtooth-like structure is from 1 μm to 10 mm, such as from 100 to 500 μm.

The second primary redirecting structure 12 forms a similar sawtooth-like structure as the second secondary redirecting structure 13. This is however not illustrated in detail in FIG. 20.

The embodiment of FIG. 20 illustrates a situation where an (possible unintended) misalignment of the first secondary redirecting structure 9 is accounted for by means of the retroreflecting structure of second secondary redirecting structure 13 such that light is returned back to the first secondary redirecting structure 9 and subsequently to the detector device 14.

The invention claimed is:

1. A device for detecting presence of an object at the device, the device comprising
    a light source,
    a first redirecting structure comprising a first primary redirecting structure,
    a second redirecting structure comprising a second primary redirecting structure, and
    a light detector device,
    wherein the light source is adapted to emit light towards the first primary redirecting structure, the first primary redirecting structure is adapted to redirect light from the light source towards the second primary redirecting structure, the second primary redirecting structure is adapted to return light from the first primary redirecting structure back towards the first primary redirecting structure, and the first primary redirecting structure is adapted to redirect light from the second primary redirecting structure towards the light detector device, and wherein the device has a sensing zone comprising a first sensing zone formed by light propagating between the first primary redirecting structure and the second primary redirecting structure; and
    a planar waveguide comprising a first surface and a second surface and adapted for guiding light propagating from the light source towards the first redirecting structure, and for guiding light propagating from the first redirecting structure towards the light detector device, the planar waveguide further comprising a concave surface for receiving light from the light source and directing the received light towards the first redirecting structure.

2. The device according to claim 1, wherein the second redirecting structure comprises a retroreflecting structure.

3. The device according to claim 1, wherein the second redirecting structure comprises a plane mirror.

4. The device according to claim 1, wherein the light source and the light detector device are adjacent in relation to the redirecting structures.

5. The device according to claim 1, wherein the first redirecting structure comprises a first secondary redirecting structure, and the second redirecting structure comprises a second secondary redirecting structure, and wherein the light source is adapted to emit light towards the first secondary redirecting structure, the first secondary redirecting structure is adapted to redirect light from the light source towards the second secondary redirecting structure, the second secondary redirecting structure is adapted to return light from the first secondary redirecting structure back towards the first secondary redirecting structure, and the first secondary redirecting structure is adapted to redirect light from the second secondary redirecting structure towards the light detector device, and wherein the sensing zone comprises a second sensing zone formed by light propagating between the first secondary redirecting structure and the second secondary redirecting structure, and wherein light propagating between the first secondary redirecting structure and the second secondary redirecting structure intersects light propagating between the first primary redirecting structure and the second primary redirecting structure, such that the first sensing zone and the second sensing zone mutually overlap.

6. The device according to claim 1, wherein the first redirecting structure comprises a reflecting structure having a surface forming an angle relative to the first surface within a range of 60°-89°.

7. The device according to claim 6, wherein the angle relative to the first surface is within a range of 70°-86°.

8. The device according to claim 7, wherein the angle relative to the first surface is within a range of 76°-82°.

9. The device according to claim 1, wherein the planar waveguide is adapted for guiding light between the first redirecting structure and the second redirecting structure, such that at least part of the first surface is within the sensing zone.

10. The device according to claim 9, wherein the planar waveguide comprises a first planar waveguide layer next to the first surface and a second planar waveguide layer next to the second surface, wherein the first waveguide layer is adapted for guiding light between the first redirecting structure and the second redirecting structure, and wherein the second waveguide layer is adapted for guiding light propagating from the light source towards the first redirecting structure, and for guiding light propagating from the first redirecting structure towards the light detector device.

11. The device according to claim 9, wherein the first redirecting structure is adapted such that light guided by the planar waveguide changes angle of incidence relative to the first surface after being redirected by the first redirecting structure.

12. The device according to claim 11, wherein the angle of incidence is changed such that light guided by the planar waveguide from the light source towards the first redirecting structure cannot be disturbed by the object, and such that after being redirected by the first redirecting structure the redirected light may be disturbed by the object when guided by the planar waveguide from the first redirecting structure towards the second redirecting structure.

13. The device according to claim 1, adapted such that light propagating between the first redirecting structure and the second redirecting structure propagates at least partly in the medium, such as air, bordering the device.

14. The device according to claim 1, wherein the width of the light detector device is at least 5 times smaller than the width of the second primary redirecting structure.

15. The device according to claim 14, wherein the width of the light detector device is at least 10 times smaller than the width of the second primary redirecting structure.

16. The device according to claim 14, wherein the width of the light detector device is at least 15 times smaller than the width of the second primary redirecting structure.

17. The device according to claim 1, wherein the device is part of a touch screen, e.g. incorporated in an optical table or a handheld device such as a handheld device comprising at least one of a mobile phone, a pda, and a portable music player.

18. A method for detecting presence of an object, the method comprising
    emitting light from a light source towards a first primary redirecting structure,
    redirecting, by means of the first primary redirecting structure, light from the light source towards a second primary redirecting structure,
    returning, by means of the second primary redirecting structure, light from the first primary redirecting structure back towards the first primary redirecting structure,
    redirecting, by means of the first primary redirecting structure, light from the second primary redirecting structure towards the light detector device,
    forming a first sensing zone by means of light propagating between the first primary redirecting structure and the second primary redirecting structure;
    receiving the light from the light source at a concave surface to direct the received light towards the first redirecting structure;
    guiding the light propagating from the light source through a planar waveguide comprising a first surface and a second surface towards the first redirecting structure; and
    guiding light propagating from the first redirecting structure towards the light detector device.

\* \* \* \* \*